(12) United States Patent
Pinzon Estupinan et al.

(10) Patent No.: US 12,340,551 B2
(45) Date of Patent: Jun. 24, 2025

(54) COGNITIVE PLACEMENT OF CAPTIONED TEXT

(71) Applicant: International Business Machines Corporation, Armonk, NY (US)

(72) Inventors: Juan Carlos Pinzon Estupinan, Sacramento, CA (US); Ashutosh Vishwas Mate, San Jose, CA (US); Vinayak Harnoor, Pleasanton, CA (US); Evelyn Bahiyyih Pirnia, San Mateo, CA (US)

(73) Assignees: International Business Machines Corporation, Armonk, NY (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 273 days.

(21) Appl. No.: 18/154,302

(22) Filed: Jan. 13, 2023

(65) Prior Publication Data
US 2024/0242465 A1    Jul. 18, 2024

(51) Int. Cl.
*G06V 10/26* (2022.01)
*G06V 20/40* (2022.01)
*G06V 20/62* (2022.01)
*H04N 5/278* (2006.01)

(52) U.S. Cl.
CPC ............ *G06V 10/267* (2022.01); *G06V 20/41* (2022.01); *G06V 20/635* (2022.01); *H04N 5/278* (2013.01)

(58) Field of Classification Search
CPC .. H04N 21/4884; H04N 5/278; G06V 10/267; G06V 20/41; G06V 20/635
See application file for complete search history.

(56) References Cited

U.S. PATENT DOCUMENTS

| | | |
|---|---|---|
| 8,223,269 B2 | 7/2012 | Ikegami |
| 8,619,192 B2 | 12/2013 | Smith et al. |
| 8,947,596 B2 | 2/2015 | Schmidt |
| 10,542,323 B2 | 1/2020 | Chou et al. |

(Continued)

OTHER PUBLICATIONS

Barnard, Kobus, et al. "Matching words and pictures." The Journal of Machine Learning Research 3 (2003): 1107-1135. (Year: 2003 ).*

(Continued)

*Primary Examiner* — William A Beutel
(74) *Attorney, Agent, or Firm* — Cantor Colburn LLP

(57) ABSTRACT

Embodiments of the invention provide a computer system that includes a processor communicatively coupled to a memory. The processor is operable to perform processor operations that include accessing video information having a plurality of image regions; and accessing text information associated with the video information. The text information is used to determine a set of relevance results that result from performing a relevance evaluation on each of the plurality of image regions. A first group of relevance results are determined, where the first group of relevance results are within the set of relevance results. A first group of image regions are determined, where the first group of image regions are within the plurality of image regions that are associated with the first group of relevance results. The text information is incorporated within a selected one of the first group of image regions.

20 Claims, 10 Drawing Sheets

(56) References Cited

U.S. PATENT DOCUMENTS

| | | | |
|---|---|---|---|
| 10,880,515 | B2 | 12/2020 | Yi et al. |
| 11,250,872 | B2 | 2/2022 | Thomas et al. |
| 11,804,044 | B1* | 10/2023 | Rose .............. G06V 20/49 |
| 2009/0273711 | A1* | 11/2009 | Chapdelaine .......... G11B 27/34 |
| | | | 348/E7.001 |
| 2015/0009305 | A1 | 1/2015 | Suh et al. |
| 2018/0199112 | A1* | 7/2018 | Chou ................. H04N 21/8133 |
| 2018/0302687 | A1 | 10/2018 | Bhattaacharjee et al. |
| 2019/0158927 | A1 | 5/2019 | Catalano et al. |
| 2022/0005477 | A1 | 1/2022 | Ma et al. |
| 2022/0148270 | A1 | 5/2022 | Goodrich et al. |
| 2022/0272284 | A1 | 8/2022 | Chandrashekar et al. |

OTHER PUBLICATIONS

AST: A verbit company "CaptionSync Smart Player™" https://www.automaticsync.com/captionsync-smart-player/ (Retrieved Jan. 13, 2023), 3 pages.

Berke et al., "Preferred Appearance of Captions Generated by Automatic Speech Recognition for Deaf and Hard-of-Hearing Viewers", CHI EA'19 ACM CHI Conference On, pp. LBW 1713:1-6 (2019): 6 pages.

Gan et al.; "StyleNet: Generating Attractive Visual Captions With Styles", CVPR IEEE Conference On,(2017): pp. 1-10.

Gupta et al., "Using Closed Captions as Supervision for Video Activity Recognition", AAAI'10 24th ACM AAAI Conference On, (2010):pp. 1083-1088.

Hulu "Using closed captions and subtitles on Hulu" : https://help.hulu.com/s/article/using-captions (Retrieved Jan. 4, 2023), 7 pages.

Kinoshita et al., "All Intelligent Captioning System for the Optimization of Image and Caption Visibility", Ritsumeikan University, Japan,(2002): pp. 1-14.

Nguyen et al., "EAES: Effective Augmented Embedding Spaces for Text-Based Image Captioning", IEEE Access, vol. 10, (2022): pp. 32443-32452.

* cited by examiner

COGNITIVE PLACEMENT OF CAPTIONED TEXT

BACKGROUND

The present invention relates in general to programmable computer systems operable to generate captioned text and/or subtitles for video. More specifically, the present invention relates to computing systems, computer-implemented methods, and computer program products operable to cognitively determine an optimal placement for captioned text and/or subtitles on a display image.

Closed captioning describes a variety of technologies and/or processes that are used to generate a text alternative to an audio track. The term "closed" in closed captioning means that the captions are not displayed unless the user activates them. The text can be displayed as on-screen subtitles or as an overlay. Closed captioning is used in a variety of situations where it would be inappropriate to play the audio components of a program, including, for example, viewers who have trouble hearing, viewers who are watching a program in a noisy environment, and/or viewers who want to improve their understanding of a particular language.

There are three main types of closed captioning—live, recorded, and computer-generated. Live captions are created as the program is being aired, and they are typically only live broadcasts such as sporting events and some news programs. Recorded captions are created after the program has been filmed or recorded, and they can be used for both live and pre-recorded programs. Computer-generated captions are created using speech recognition software, and they tend to be less accurate than live or recorded captions. However, they can be used for any type of program.

Closed captioning can be displayed in various ways, depending on the preference of the viewer. It can be shown as a scroll of text at the bottom of the screen, or it may be displayed as symbols that indicate different types of information, such as speaker changes or sound effects. Some closed captioning systems also allow viewers to control the timing and placement of the text on the screen.

SUMMARY

Embodiments of the invention provide a computer system that includes a processor communicatively coupled to a memory. The processor is operable to perform processor operations that include accessing video information having a plurality of image regions; and accessing text information associated with the video information. The text information is used to determine a set of relevance results that result from performing a relevance evaluation on each of the plurality of image regions. A first group of relevance results are determined, where the first group of relevance results are within the set of relevance results. A first group of image regions are determined, where the first group of image regions are within the plurality of image regions that are associated with the first group of relevance results. The text information is incorporated within a selected one of the first group of image regions.

Embodiments of the invention also provide computer-implemented methods and/or computer program products having substantially the same features as the computer system described above.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1:
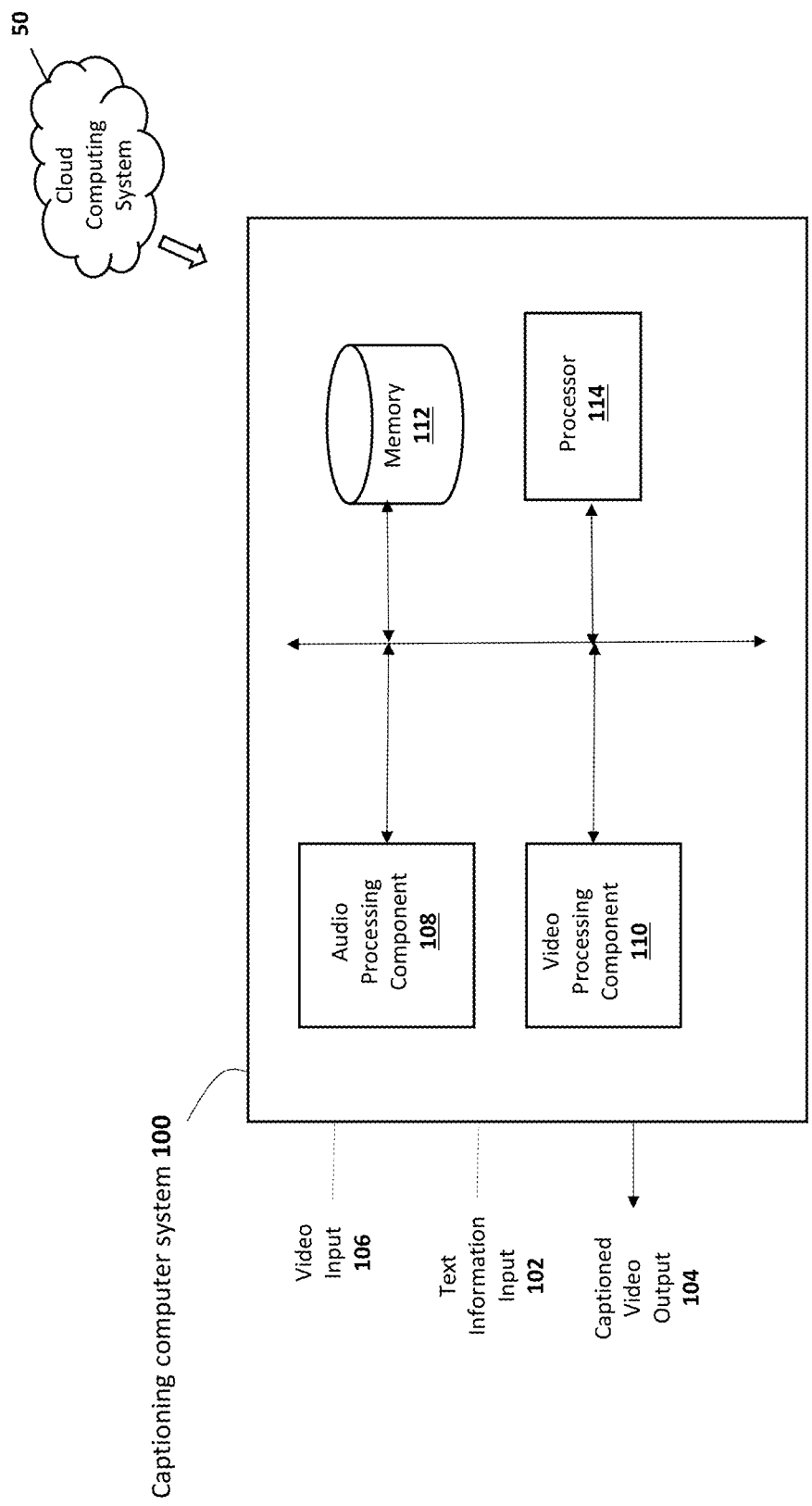
FIG. 1 depicts a block diagram illustrating a system according to embodiments of the invention.

In the accompanying figures and following detailed description of the disclosed embodiments, the various elements illustrated in the figures are provided with three digit reference numbers. In some instances, the leftmost digits of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units of the systems described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, function as the module and achieve the stated purpose for the module.

Many of the functional units of the systems described in this specification have been labeled as models. Embodiments of the invention apply to a variety of model implementations. In some embodiments of the invention, the models described herein can be implemented as machine learning algorithms and natural language processing algorithms configured and arranged to uncover unknown relationships between data/information and generate a model that applies the uncovered relationship to new data/information in order to perform an assigned task of the model. In some aspects of the invention, the models described herein can have all of the features and functionality of the models depicted in FIGS. 8A and 8B, which are described in greater detail subsequently herein.

Turning now to an overview of technologies that are relevant to and/or support aspects of the invention, captions and/or subtitles can be manually or automatically generated for various types of video programming or content that is available to view on various devices, including, for example, television sets, mobile phones, tablets, laptops, and the like. In some implementations, the video content includes critical information such as the location, time, or name of presenter; stock-ticker information; scores of sporting events; advertisement; and the like. Caption text that is displayed or placed in poor locations on the display screen can cover objects or information displayed as part of the program and make it difficult to comprehend the content. Viewers in public places like gyms, airports, and hospitals usually have their captioning function turned on as their television/phone must be muted so as not to disturb others.

Turning now to an overview of aspects of the invention, embodiments of the invention provide computing systems, computer-implemented methods, and computer program products operable to cognitively determine a placement location for captioned text and/or subtitles within video content presented on a display. Embodiments of the invention use video/audio/text processing functionality working in tandem with cognitive processing techniques (e.g., various types of trained machine learning algorithms) to segment the to-be-displayed content into non-critical content and critical content using an initial version of a relevance evaluation. In some embodiments of the invention, the initial version of the relevance evaluation is based at least in part on the substance of the caption text, the substance of the video/audio content itself, and other information from which insight can be gleaned about the relevancy or importance of a given portion of the video content to a viewer's understanding of the substance of the video content. In general, the noncritical content (e.g., background scenes, static elements, elements that are not deemed important to the content) is content that has been determined in accordance with aspects of the invention (e.g., using cognitive processing techniques) to not be important for a viewer's understanding of the video content, and the critical content (e.g., text, actors, participants in a sporting event) is content that has been determined in accordance with aspects of the invention (e.g., using cognitive processing techniques) to be important to the viewer's understanding of the video content. In some embodiments of the invention, the cognitive processing techniques can be trained to set a threshold relevancy level, such that content regions having relevancy levels at or above the threshold relevancy level are classified as critical content, and such that content regions having relevancy levels below the threshold relevancy level are classified as non-critical content. In some embodiments of the invention, the cognitive processing techniques can be trained to set a threshold relevancy level, such that content regions having relevancy levels above the threshold relevancy level are classified as critical content, and such that content regions having relevancy levels at or below the threshold relevancy level are classified as noncritical content. In some embodiments of the invention, the noncritical content is specifically determined to be inappropriate for (or disqualified from) receiving placement of captioned text because reading captioned text in a region that contains the noncritical content would have a negative impact on user experience (UX) by requiring the viewer to divert attention too far away from any region that has critical content.

In some embodiments of the invention, the identified critical content is subdivided into critical content sub-regions, and each sub-region is ranked using another version of a relevance evaluation, which is also based on the substance of the caption text, the substance of the video/audio content itself, and other information from which insight can be gleaned about the relevancy or importance of each critical sub-region's content to a viewer's understanding of the substance of the each critical sub-region's content. For example, under the critical/non-critical initial relevance evaluation, a critical content sub-region can be identified, and under the subsequently applied relevancy analysis, three (3) sub-regions of the critical content region can be identified and relevancy scores (from most relevant to least relevant) can be computed. For example, a relevancy score of ten (10) can be computed for a first critical content sub-region; a relevancy score of seven (7) can be computed for a second critical content sub-region; and a relevancy score of five (5) can be computed for a third critical content sub-region. In embodiments of the invention, the caption text would be placed within the third critical content sub-region, which has the lowest relevance score, and which allows the viewer to keep his/her focus on one of the critical content sub-regions when reading caption text but places the caption text in the least relevant of the available critical content sub-regions.

In some embodiments of the invention, a visibility analysis is used to determine the placement of the caption text within the selected critical content sub-region. In embodiments of the invention, the visibility analysis is performed using cognitive processing techniques trained to select the position, size, color, location, background format, and/or transparency of the caption text within the selected critical content sub-region.

In some embodiments of the invention, the system is operable to provide a default caption text placement location, and the above-described processes are invoked if the system determines that the default caption text location will cover critical information like text, a player in a game, an actor, etc. that is part of the underlying program content. Embodiments of the invention can be configured to automatically detect such cases and change the size, color, location, background format and/or visibility and transparency of the captioned text using the above-described novel caption text placement processes. Embodiments of the invention can be further configured to automatically detect when the above-described caption text placement processes are no long needed and return to the default caption text placement location until it is determined that the above-described caption text placement processes are needed again.

Suitable cognitive processing techniques that can be used to implement the above-described caption text placement processes in accordance with aspects of the invention include proving a cognitive processor (or equivalent cognitive computing elements) operable to implement various types of machine learning algorithms and related technologies (e.g., audio, video, image, and text processors) to determine inferences and/or relationships among digital data. For example, machine learning technologies, signal processing technologies, image processing technologies, data analysis technologies and/or other technologies employ machine learning models to analyze digital data, process digital data, determine inferences from digital data, and/or determine relationships among digital data.

Machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs. ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

More specific example of suitable cognitive processing tools that can be used to implement the above-described caption text placement processes in accordance with aspects of the invention include "Watson AI—Cognitive Video Analytics," "Noun-spotter," "Scene Analysis," "Optical Flow," convolutional neural networks (CNNs), and the like. "Watson AI—Cognitive Video Analytics," "Noun-spotter," "Scene Analysis," and "Optical Flow" are trade names of their respective companies or owners.

In embodiments of the invention, the captioned text can be closed captioned text, non-closed caption text, subtitles, and the like. In some embodiments of the invention, the audio can be on one language, and the captioned text can be a translation of the audio into another language.

FIG. 1 depicts an example captioning computer system 100 that is capable of implementing one or more embodiments of the invention. System 100 includes an audio processing component 108, a video processing component, a memory 112, and a processor 114 configured and arranged as shown. In general, the captioning computer system 100 is a cognitive-based tool that, in certain embodiments of the invention, applies one or more machine learning models and/or engines operable to cognitively determine an optimal placement for captioned text and/or subtitles on a display image. More specifically, the captioning computer system 100 is configured to generate a captioned video output 104 from a received video input 106. The audio processing component 108 is configured to analyze an audio portion of the received video input 406 using all of the functionality and features that are used to process audio in conventional caption and/or subtitle processing systems. Similarly, the video processing component 110 is configured to analyze frames of the received video input 106 using all of the functionality and features that are used to process video in conventional caption and/or subtitle processing systems. In some embodiments of the invention, video is processed by the captioning computer system 100 via one or more video and/or audio cognitive extraction engines that execute one or more or more machine learning techniques, models, and/or APIs (application program interfaces) via a machine learning service, such as for example, through the use of IBM Watson®.

In some embodiments of the invention, the memory 112 stores computer executable components and instructions; and the processor 114 is operable to facilitate execution of the instructions (e.g., computer executable components and corresponding instructions) by the captioning computer system 100. As shown, the audio processing component 108, the video processing component 110, the memory 112, and/or the processor 114 are electrically and/or communicatively coupled to one another in one or more embodiments of the invention.

A cloud computing system 50 is in wired or wireless electronic communication with the system 100. The cloud computing system 50 can supplement, support or replace some or all of the functionality (in any combination) of the components of the system 100. Additionally, some or all of the functionality of the components of the system 100 can be implemented as a node of the cloud computing system 50. Additional details of cloud computing functionality that can be used in connection with aspects of the invention are depicted by the computing environment 900 shown in FIG. 9 and described in greater detail subsequently herein.

In some embodiments of the invention, the captioning computer system 100 uses the processor 114 to implement various cognitive computing operations (e.g., the cognitive processor 502, 602, 702 shown in FIGS. 5, 6, 7) based on features that are extracted from the audio and/or video portions of the received video input 106 (e.g., via audio processing component 108, video processing component 110, and/or processor 114). In some embodiments of the invention, the captioning computer system 100 employs parallel computing to process portions of the received video input 106. For instance, in some embodiments of the invention, the captioning computer system 100 performs parallel computing associated with two or more processors that process one or more portions of the received video input 106 in parallel.

In some embodiments of the invention, the captioning computer system 100 is configured to receive a video input 106 and generate caption data from the received video input 106. Various suitable types of video input may be received in various different types of suitable formats, such as for example, Moving Pictures Expert Group 4 (MP4) format, Audio Video Interleave (AVI) format, Flash Video Format (FLV) format, and Windows Media Video (WMV). In some embodiments of the invention, the video includes one or more scenes that are found in a plurality of frames of the received video input 106. In some embodiments of the invention, one or more frames of the received video input 106 includes one or more objects and/or one or more characters. For example, a frame may include an image of two people speaking to each other in front of a monument. In that example, the monument is a visual object and the people are speaker characters found in the frame. The phrase "characters" as used herein refers to any person or animal that is found within at least one of the audio portion or the video portion of the received video input 106. In some embodiments of the invention, a character found in the video can be a narrator who is heard in one or more audio portions of the video but may or may not be seen in any given frame of the video. In some embodiments of the invention, the received video input 106 includes one or more movies, films, television shows, or other suitable types of visual recordings (i.e., content). The video input 106 may be a video that is being captured in real-time or a prior recorded video. In some embodiments of the invention, the video input 106 includes animated characters and/or other visual objects.

The captioning computer system 100 is configured to generate closed caption data. In some embodiments of the invention, the closed caption data is generated based at least in part on extracting text data from an audio portion of the received video input 106 (e.g., via audio processing component 108). In some embodiments of the invention, the text data is generated in another manner (e.g., through manual transmission) and provided at text information input 102. In some embodiments of the invention, the text data includes spoken words or other sounds that are extracted from the audio portion of the received video input 406. In some embodiments of the invention, the text data is extracted via a speech-to-text technique such as via a speech-to-text API. One example suitable API is the speech-to-text API provided by IBM® Watson™. Other suitable types of speech-to-text algorithms or APIs may be used that allow for speech-to-text translation of audio data.

The captioning computer system 100 is configured to analyze the audio data and/or the extracted text to determine the nature of a conversation that is captured within the received video input 106 (e.g., within the audio and/or video portions of received video input 106). For example, in some embodiments of the invention, this determination includes analyzing the text data to extract one or more of a tone of spoken words, sentiment, mood, and/or intensity of one or more speakers. In some embodiments of the invention, the determination is achieved by application of one or more machine learning algorithms or APIs. Some suitable non-limiting examples of the machine learning algorithms or APIs that can be used within the context of one or more embodiments of the invention include a "natural language understanding" API, a "tone analyzer" API, a "visual recognition" API and/or a "natural language classifier API provided by IBM® Watson™. Other suitable cognitive based algorithms or techniques may be used such that a nature of a conversation found in the video input 106 may be ascertained. In some embodiments of the invention, caption data that is generated the captioning computer system 100 includes extracted text and any combination of tone, sentiment, mood, and/or intensity information. Some examples of non-speech audio that can be converted into caption text include animal sounds, background noise, music, and the like.

The captioning computer system 100 is configured to process frames of the reviewed video on a frame-by-frame basis to identify frames having spoken dialog and/or audio that is to be converted into a caption text. For example, in some embodiments of the invention, captioning computer system 100 is configured to match the extracted text to frames of the video that are associated with the generated closed caption data (e.g., extracted text). This may include associating a timestamp of the audio portion of the received video input 106 with a timestamp of a current frame of the video input 106.

In some embodiments of the invention, the captioning computer system 100 is configured to determine which characters are speaking within a current frame. For example, in some embodiments of the invention, the captioning computer system 100 is configured to determine, starting from a first frame of the received video, whether closed caption data exists for the current frame at the corresponding timestamp. If there is no audio for the current frame, then a subsequent frame of the video is processed. In some embodiments of the invention, a frame counter is incremented if the caption data does not exist for the current frame at the corresponding timestamp. For each given frame of the received video that has caption data associated, one or more characters are who are speaking in the given frame are identified by the captioning computer system 100. In some embodiments of the invention, the one or more characters who are speaking in the frame are identified via a combination of facial recognition and audio tone matching.

In some embodiments of the invention, the captioned computing system 100 is operable to take into consideration one or more colors of the background of the current frame in the selection of an optimal location such that closed caption text that is to be inserted does not blend into the background. For example, in some embodiments of the invention, text may be outlined in a color that is different from the font color if the text will span across complex background having multiple background colors or if the text will span across a background or object of similar color to the caption text. In some embodiments of the invention, the optimal location of caption text for a character that is not visually within the frame may be placed towards the right or left hand side of the frame to indicate the character's location relative to the scene.

Figure 2:
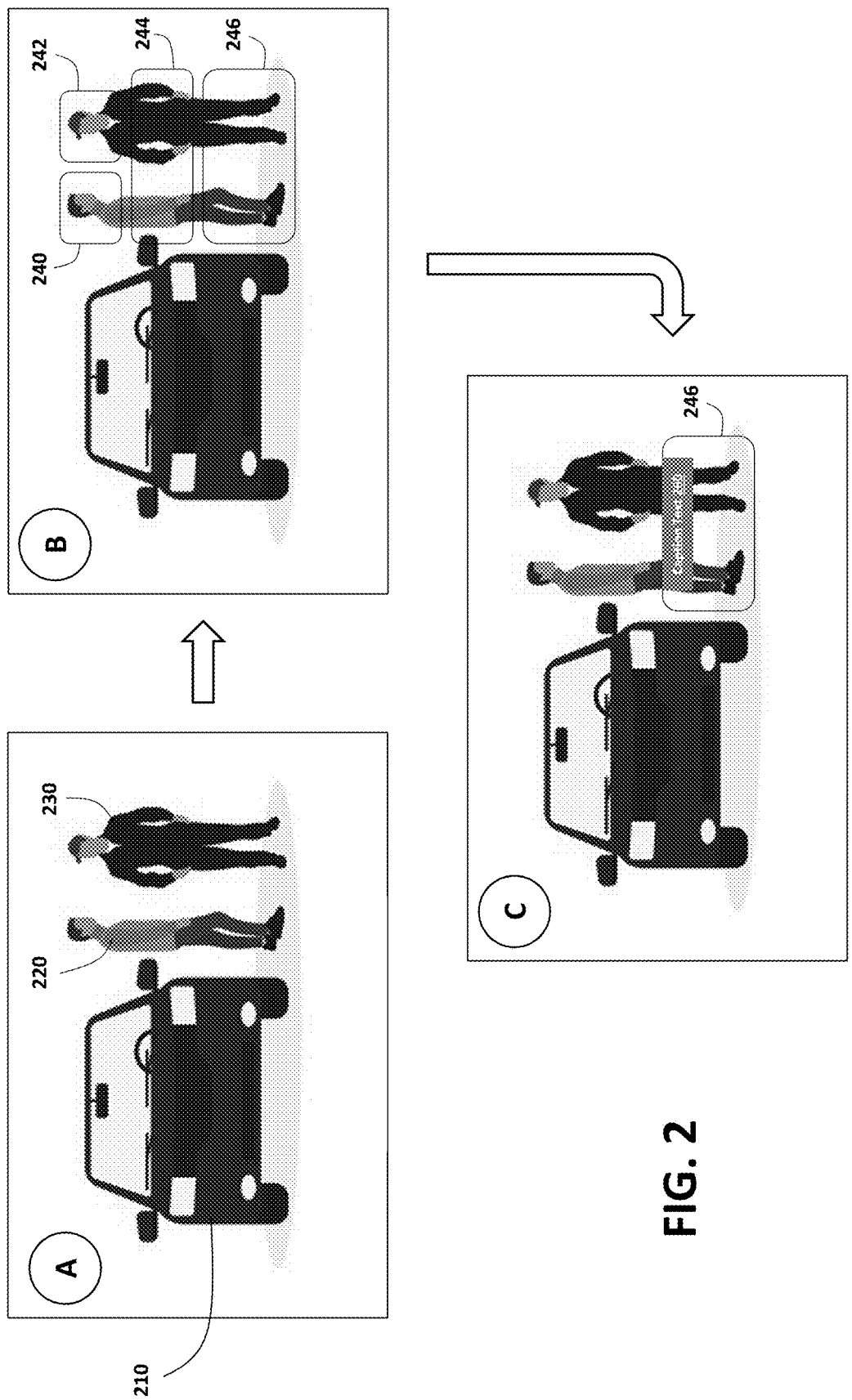
FIG. 2 depicts a non-limiting example of caption text placement according to embodiments of the invention.
Figure 3:
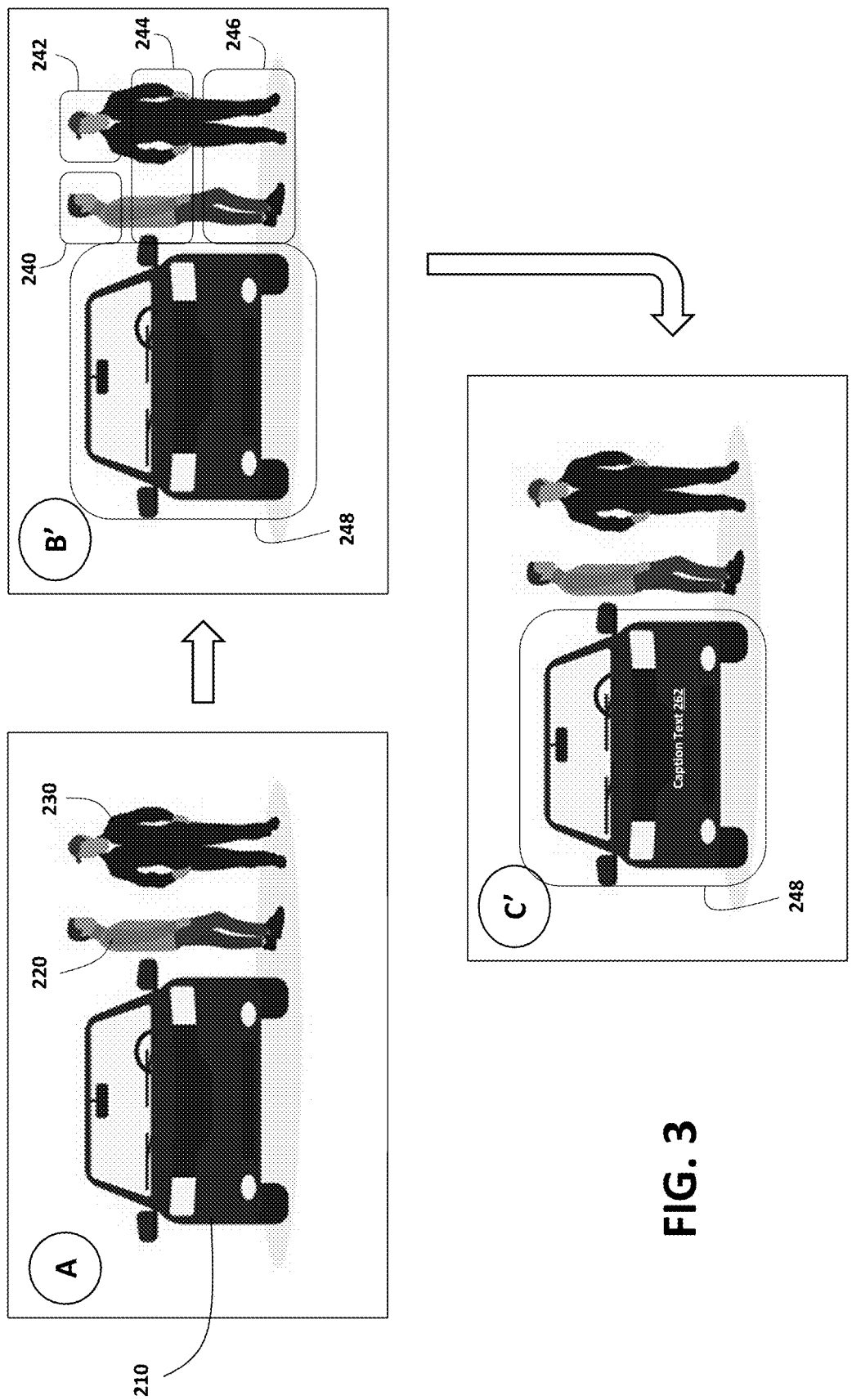
FIG. 3 depicts a non-limiting example of caption text placement according to embodiments of the invention.
Figure 4:
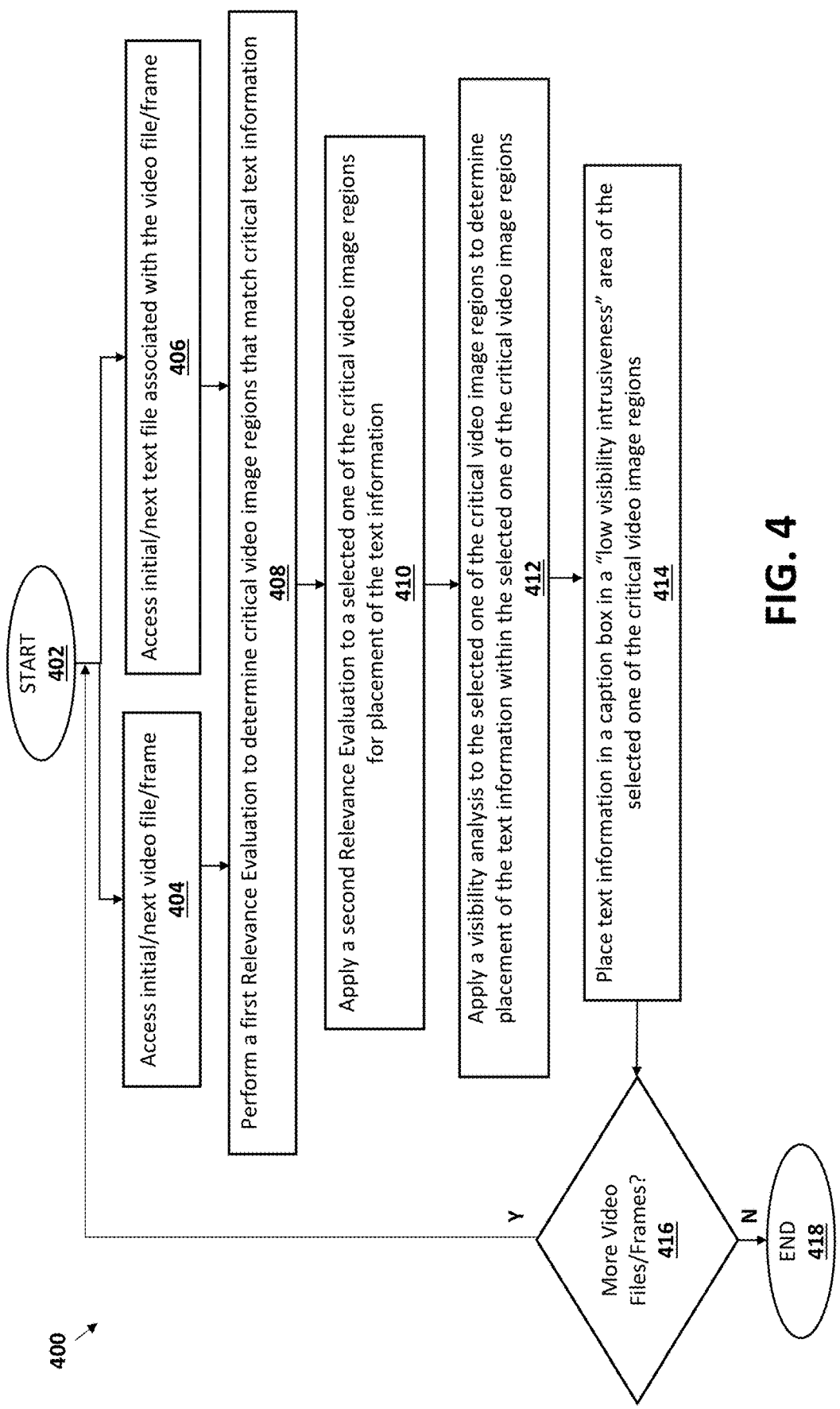
FIG. 4 depicts a flow diagram illustrating a methodology in accordance with embodiments of the invention.
Figure 5:
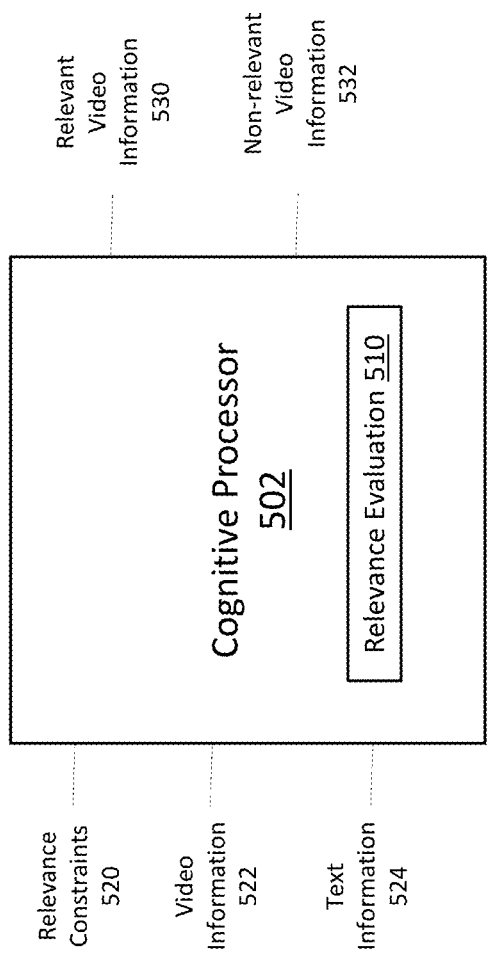
FIG. 5 depicts a block diagram illustrating a cognitive processor in accordance with embodiments of the invention.
Figure 6:
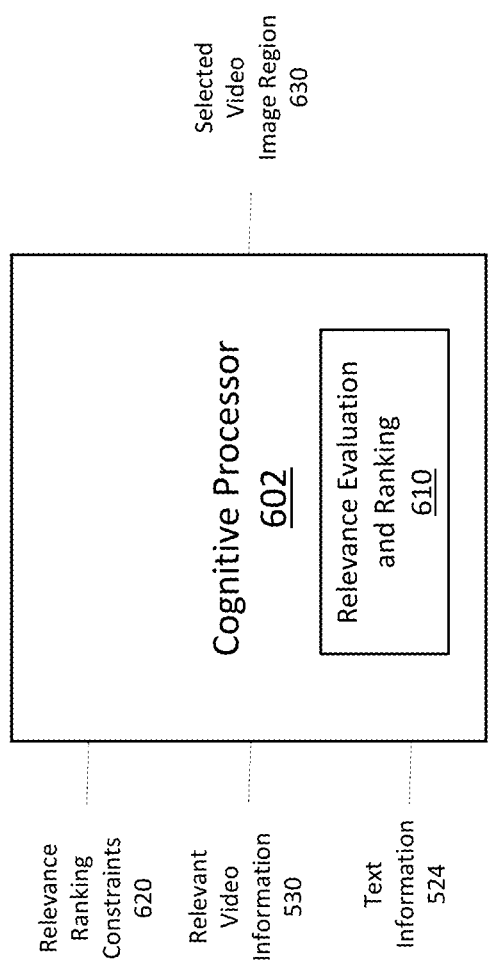
FIG. 6 depicts a block diagram illustrating a cognitive processor in accordance with embodiments of the invention.
Figure 7:
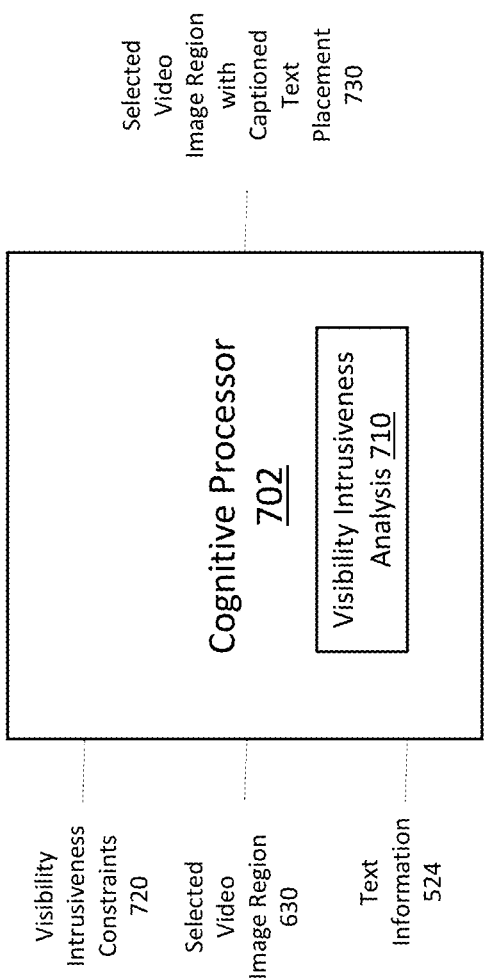
FIG. 7 depicts a block diagram illustrating a cognitive processor in accordance with embodiments of the invention.

Example operations of the system 100 in accordance with embodiments of the invention are depicted in FIGS. 2-7. More specifically, FIG. 2 depicts display images A, B, and C illustrating a non-limiting example of caption text placement according to embodiments of the invention; FIG. 3 depicts display images A, B', and C' illustrating another non-limiting example of caption text placement according to embodiments of the invention; FIG. 4 depicts a flow diagram illustrating a methodology 400 performed by the system 100 in accordance with embodiments of the invention; FIG. 5 depicts a block diagram illustrating a cognitive processor 502 in accordance with embodiments of the invention; FIG. 6 depicts a block diagram illustrating a cognitive processor 610 in accordance with embodiments of the invention; and FIG. 7 depicts a block diagram illustrating a cognitive processor 710 in accordance with embodiments of the invention.

The methodology 400 will now be described with reference to the example display images A, B, and C shown in FIG. 2, as well as the components depicted in FIGS. 1, 5, 6, and 7. As shown in FIG. 2, display image A is depicted prior to generations of any captioned text. The display image A depicts an automobile 210, the automobile's owner 220, and a mechanic 230, configured and arranged as shown. In some embodiments of the invention, at the stage depicted in display image A, the system 100 has determined that a default positioning captioned text in the display image A will not be appropriate, and so the methodology 400 is invoked. In some embodiments of the invention, at the stage depicted in display image A, the system 100 has been configured to utilize the methodology 400 to determine caption text location in all instances with no default positions.

As shown in FIG. 4, the methodology 400 begins at block 402 then moves in parallel to blocks 404, 406. At block 404, the initial or next video frame file is accessed; and at block 406, the initial or next text file associated with the video file/frame is accessed. In embodiments of the invention, the initial/next text file can be generated in any suitable manner, including an automated conversion of audio components of the video file/frame to text, as well as non-automated conversion of audio components of the video file/frame to text. The information generated at block 404, 406 is provided to block 408 where the methodology 400 performs a first relevance evaluation to determine critical video image regions that match the critical text information. In some embodiments of the invention, the first relevance evaluation in block 408 can be implemented by the cognitive processor 502, which is shown in FIG. 5 and is operable to implement a relevance evaluation 510. The cognitive processor 502 can be trained to perform a relevance evaluation 510.

In embodiments of the invention, the cognitive processor 502 uses cognitive processing techniques (e.g., various types of trained machine learning algorithms) to segment the display image A (shown in FIG. 2) into non-critical content and critical content using an initial version of a relevance evaluation (e.g., the relevance evaluation 510). In some embodiments of the invention, the relevance evaluation 510 is based on the substance of the caption text (e.g., the text information 524), the video content itself (e.g., the video information 522), and other information (e.g., relevance constraints 520) from which insight can be gleaned about the relevancy or importance of a given portion of the display image A to a viewer's understanding of the substance of the video content. In general, the noncritical content (e.g., background scenes, static elements, elements that are not deemed important to the content) is content that has been determined in accordance with aspects of the invention (e.g., using cognitive processor 502 and the relevance evaluation 510) to not be important for a viewer's understanding of the video content, and the critical content (e.g., text, actors, players in a game) is content that has been determined in accordance with aspects of the invention (e.g., using cognitive processor 502 and the relevance evaluation 510) to be important to the viewer's understanding of the video content. In some embodiments of the invention, the cognitive processor 502 can be trained to set a threshold relevancy level, such that content regions having relevancy levels at or above the threshold relevancy level are classified as critical content (e.g., relevant video information 530), and such that content regions having relevancy levels below the threshold relevancy level are classified as noncritical content (e.g., non-relevant video information 532). In some embodiments of the invention, the cognitive processor 502 can be trained to set a threshold relevancy level, such that content regions having relevancy levels above the threshold relevancy level are classified as critical content (e.g., relevant video information 530), and such that content regions having relevancy levels at or below the threshold relevancy level are classified as noncritical content (e.g., non-relevant video information 532). In some embodiments of the invention, the noncritical content is specifically determined to be inappropriate for (or disqualified from) receiving placement of captioned text because reading captioned text in a region of noncritical content would have a negative impact on user experience by requiring the viewer to divert attention too far away from any region that has critical content.

In display image B, the operations depicted at block 408 have been used to identify critical video image regions 240, 242, 244, 246 and non-critical image regions (all portions of the display image B that are not the critical video image regions 240, 242, 244, 246). In the display image B, the cognitive processor 502 has determined that the owner 220 is having a conversation with the mechanic 230. Accordingly, a critical video image region 240 is defined around the face and head of the owner 220; and a critical video image 242 is defined around the face and head of the mechanic 230. In the display image B, the cognitive processor 502 has determined that the owner 220 is having a conversation with the mechanic 230 and both are animating the conversation using arm gestures. Accordingly, a critical video image region 244 is defined around the torso of the owner 220 and the torso of the mechanic 230. In the display image B, the cognitive processor 502 has determined that the owner 220 is having a conversation with the mechanic 230 and both are animating the conversation by shifting their weight through moving their feet. Accordingly, a critical video image region 246 is defined around the legs and feet of the owner 220 and the torso of the mechanic 230. The display image A depicts an automobile 210, the automobile's owner 220, and a mechanic 230, configured and arranged as shown. The cognitive processor 502 has determined that, although automobile 210 is the subject of the conversation between the owner 220 and the mechanic 230, it is not critical to view the automobile 210 in order to understand the subject of the conversation between the owner 220 and the mechanic 230.

Returning to the methodology 400, the critical video image regions (e.g., regions 240, 242, 244, 246) generated at block 408 is provided to block 410 where the methodology 400 performs a second relevance evaluation to select one of the critical video image regions for placement of the text information. In some embodiments of the invention, the second relevance evaluation in block 410 can be implemented by the cognitive processor 602, which is shown in FIG. 6 and is operable to implement a relevance evaluation and ranking process 610. In embodiments of the invention, the identified critical content sub-regions are ranked using the relevance evaluation and ranking process 610, which is also based on the substance of the caption text, the video content itself, and other information from which insight can be gleaned about the relevancy or importance of each critical sub-region's content to a viewer's understanding of the substance of the each critical sub-region's content. For example, under the subsequently applied relevancy evaluation and ranking process 610 relevancy scores (from most relevant to least relevant) can be computed. For example, a relevancy score of ten (10) can be computed for critical content sub-region 240 (the owner 220 is carrying the conversation); a relevancy score of nine (9) can be computed for critical content sub-region 242 (the mechanic 230 is speaking less than the owner 220); a relevancy score of seven (7) can be computed for the critical content sub-region 244; and a relevancy score of five (5) can be computed for the critical content sub-region 246. In embodiments of the invention, the critical content sub-region 246 is selected for placement of the caption text (e.g., text information 524). The critical content sub-region 246 is selected by the relevance evaluation and ranking process 610 because the sub-region 246 has the lowest relevance score, and because placing the caption text in the sub-region 246 allows the viewer to keep his/her focus on one of the critical content sub-regions 240, 242, 244, 246 when reading caption text but places the caption text in the least relevant (and least intrusive) of the available critical content sub-regions 240, 242, 244, 246.

At block 412, the methodology 400 applies a visibility analysis to the selected one of the critical video image regions to determine placement of the text information within the selected one of the critical video image regions. In embodiments of the invention, block 412 can be implemented by using the cognitive processor 702 to implement a visibility intrusiveness analysis 710 that generates the selected video image region with captioned text placement 730 based on the text information 524, the selected video image region 630, and visibility intrusiveness constraints 720. Referring to the example shown in FIG. 2, at image display C, the visibility analysis is performed using cognitive processing techniques trained to select the position, size, color, location, background format, and/or transparency of the caption text 260 within the selected critical content sub-region 246. In accordance with aspects of the invention, the caption text 260 is placed near the top of the sub-region 246 that is closes to the critical content sub-regions 244, 242, 240, which allows the viewer to read the caption text 260 while still looking in the general direction of the critical content sub-regions 244, 242, 240.

At block 414, the methodology 400 places the text information (e.g., caption text 260) in a caption box in a "low visibility intrusiveness" area (e.g., near the top of the region 246) of the selected one of the critical video image regions (e.g., region 246). The methodology 400 moves to decision block 416 determine whether there are additional video files/frames for evaluation. If the answer to the inquiry at decision block 416 is no, the methodology 400 moves to block 418 and ends. If the answer to the inquiry at decision block 416 is yes, the methodology 400 moves to the inputs to blocks 404, 406 and performs another iteration of the methodology 400. In some embodiments of the invention, the methodology 400 can check to determine if the default caption text location is appropriate before performing another iteration of the methodology 400.

FIG. 3 depicts another example of how the methodology 400 can be applied to a series of image displays A, B', C'. The image displays in FIG. 2 are substantially the same as the image displays in FIG. 3 except in FIG. 3, there is a comedic element in that while the owner 220 and the mechanic 230 are having a conversation, the owner 220 apparently forgot to place the automobile 210 in park before exiting the automobile 210, and the automobile 210 slow begins to roll away while the owner 220 and the mechanic 230 are speaking. Under this scenario, when the automobile 210 begins to roll away, the methodology 400 identifies an additional critical content region 248 as shown in image display B', and the relevance evaluation and ranking process 610 computes a relevancy score of four (4) for the critical content sub-region 248. The critical content sub-region 248 is selected by the relevance evaluation and ranking process 610 because the sub-region 248 has the lowest relevance score, and because placing the caption text in the sub-region 248 allows the viewer to keep his/her focus on one of the critical content sub-regions 240, 242, 244, 246, 248 when reading caption text but places the caption text in the least relevant (and least intrusive) of the available critical content sub-regions 240, 242, 244, 246, 248.

Block 412 of the methodology 400 applies a visibility analysis to the selected critical content sub-region 248 to determine placement and other features of the caption text 262. In embodiments of the invention, block 412 uses the cognitive processor 702 to implement the visibility intrusiveness analysis 710 that generates the selected video image region with captioned text placement 730 based on the text information 524, the selected video image region 630, and visibility intrusiveness constraints 720. Referring to the example shown in FIG. 3, at image display C', the visibility analysis is performed using cognitive processing techniques trained to select the position, size, color, location, background format, and/or transparency of the caption text 262 within the selected critical content sub-region 248. In accordance with aspects of the invention, the caption text 262 is placed near the wheels of the automobile 210 in order to bring the viewer's attention to the fact that the automobile 210 has started to slowly roll away, which allows the viewer to read the caption text 262 while still looking in the general direction of the critical content sub-regions 246, 244, 242, 240.

In embodiments of the invention, the constraints 520, 620, 720 can be set based on user preferences and allow the cognitive processors 502, 602, 702 to perform their tasks (e.g., processes 510, 610, 710) in a manner that emphasizes considerations that are important to the user, for example by using the constraints 520, 620, 720 to establish weights that will be applied to the task (e.g., processes 510, 610, 710).

In embodiments of the invention, the cognitive processors 502, 602, 702 can be implemented using computer-based Q&A modules operable to generate an answer to natural language questions that are either pre-set or presented by one or more of the designers. As a non-limiting example, the Q&A module can include all of the features and functionality of a DeepQA technology developed by IBM®. DeepQA is a Q&A system that can conduct an interrogation on any subject by applying elements of natural language processing, machine learning, information retrieval, hypothesis generation, hypothesis scoring, final ranking, and answer merging to arrive at a conclusion. Q&A systems such as IBM's DeepQA technology often use unstructured information management architecture (UIMA), which is a component software architecture for the development, discovery, composition, and deployment of multi-modal analytics for the analysis of unstructured information and its integration with search technologies developed by IBM®. In accordance with aspects of the invention, the cognitive processors 502, 602, 702 are provided with image processing and expression-based natural language processing capabilities for processing the various inputs 520, 522, 524, 620, 530, 720, 630 (shown in FIGS. 5, 6, and 7). The natural language processing capability can be implemented using a robust expression-based cognitive data analysis technology such as IBM Watson®. IBM Watson® is an expression-based, cognitive data analysis technology that processes information more like a human than a computer, through understanding natural language, generating hypotheses based on evidence and learning as it goes. Additionally, expression-based, cognitive computer analysis provides superior computing power to keyword-based computer analysis for a number of reasons, including the more flexible searching capabilities of "word patterns" over "keywords" and the very large amount of data that may be processed by expression-based cognitive data analysis.

The cognitive processors 502, 602, 702 also utilize various forms of machine learning technology in performing their tasks (e.g., processes 510, 610, 710). An example of machine learning techniques that can be used to implement aspects of the invention will be described with reference to FIGS. 8A and 8B. Machine learning models configured and arranged according to embodiments of the invention will now be described with reference to FIG. 8A.

Figure 8A:
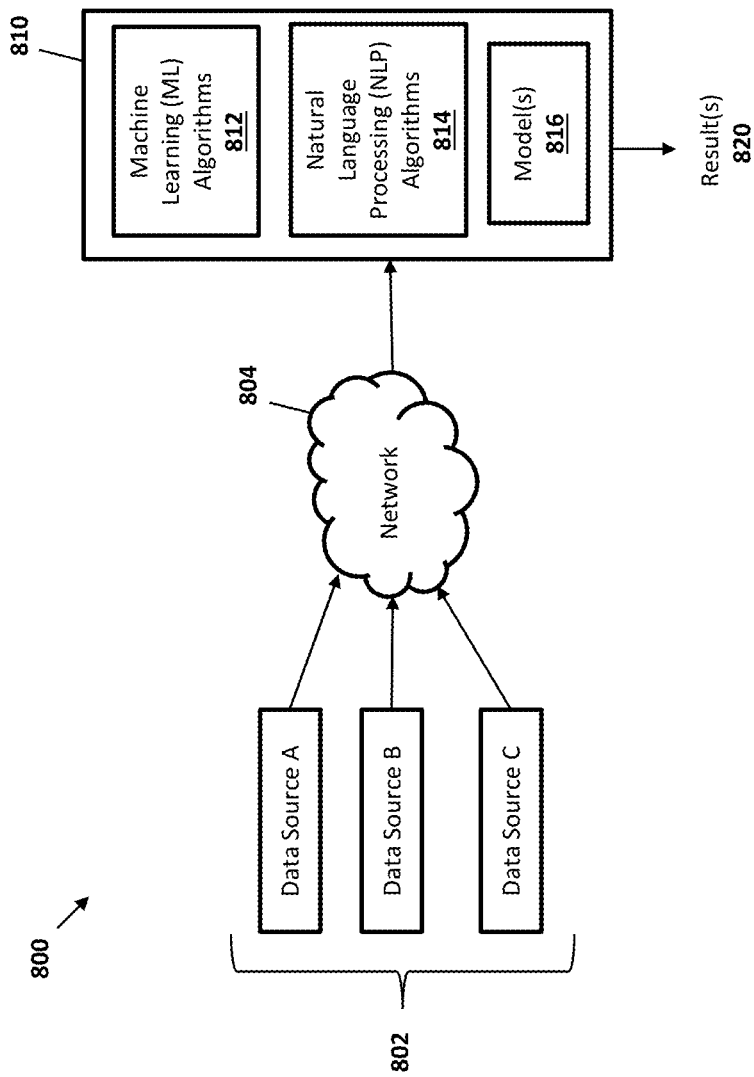
FIG. 8A depicts a machine learning system that can be utilized to implement aspects of the invention.

FIG. 8A depicts a block diagram showing a machine learning or classifier system 800 capable of implementing various aspects of the invention described herein. More specifically, the functionality of the system 800 is used in embodiments of the invention to generate various models and sub-models that can be used to implement computer functionality in embodiments of the invention. The system 800 includes multiple data sources 802 in communication through a network 804 with a classifier 810. In some aspects of the invention, the data sources 802 can bypass the network 804 and feed directly into the classifier 810. The data sources 802 provide data/information inputs that will be evaluated by the classifier 810 in accordance with embodiments of the invention. The data sources 802 also provide data/information inputs that can be used by the classifier 810 to train and/or update model(s) 816 created by the classifier 810. The data sources 802 can be implemented as a wide variety of data sources, including but not limited to, sensors configured to gather real time data, data repositories (including training data repositories), and outputs from other classifiers. The network 804 can be any type of communications network, including but not limited to local networks, wide area networks, private networks, the Internet, and the like.

The classifier 810 can be implemented as algorithms executed by a programmable computer such as a computing environment 1000 (shown in FIG. 11). As shown in FIG. 8A, the classifier 810 includes a suite of machine learning (ML) algorithms 812; natural language processing (NLP) algorithms 814; and model(s) 816 that are relationship (or prediction) algorithms generated (or learned) by the ML algorithms 812. The algorithms 812, 814, 816 of the classifier 810 are depicted separately for ease of illustration and explanation. In embodiments of the invention, the functions performed by the various algorithms 812, 814, 816 of the classifier 810 can be distributed differently than shown. For example, where the classifier 810 is configured to perform an overall task having sub-tasks, the suite of ML algorithms 812 can be segmented such that a portion of the ML algorithms 812 executes each sub-task and a portion of the ML algorithms 812 executes the overall task. Additionally, in some embodiments of the invention, the NLP algorithms 814 can be integrated within the ML algorithms 812.

The NLP algorithms 814 include speech recognition functionality that allows the classifier 810, and more specifically the ML algorithms 812, to receive natural language data (text and audio) and apply elements of language processing, information retrieval, and machine learning to derive meaning from the natural language inputs and potentially take action based on the derived meaning. The NLP algorithms 814 used in accordance with aspects of the invention can also include speech synthesis functionality that allows the classifier 810 to translate the result(s) 820 into natural language (text and audio) to communicate aspects of the result(s) 820 as natural language communications.

The NLP and ML algorithms 814, 812 receive and evaluate input data (i.e., training data and data-under-analysis) from the data sources 802. The ML algorithms 812 includes functionality that is necessary to interpret and utilize the input data's format. For example, where the data sources 802 include image data, the ML algorithms 812 can include visual recognition software configured to interpret image data. The ML algorithms 812 apply machine learning techniques to received training data (e.g., data received from one or more of the data sources 802) in order to, over time, create/train/update one or more models 816 that model the overall task and the sub-tasks that the classifier 810 is designed to complete.

Figure 8B:
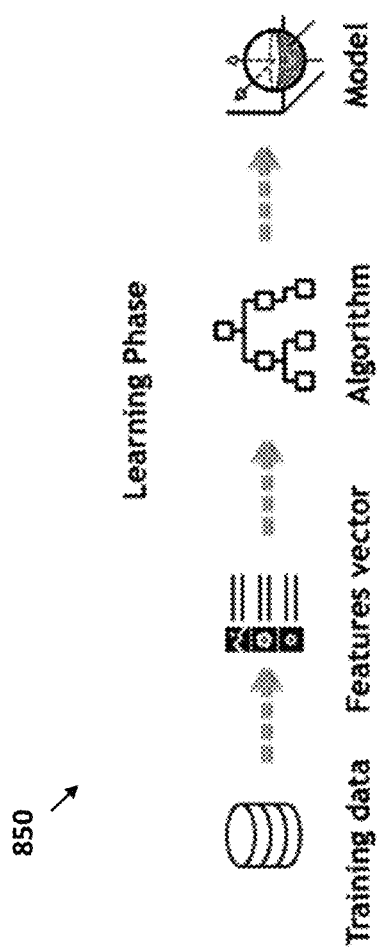
FIG. 8B depicts a learning phase that can be implemented by the machine learning system shown in FIG. 8A.

Referring now to FIGS. 8A and 8B collectively, FIG. 8B depicts an example of a learning phase 850 performed by the ML algorithms 812 to generate the above-described models 816. In the learning phase 850, the classifier 810 extracts features from the training data and coverts the features to vector representations that can be recognized and analyzed by the ML algorithms 812. The features vectors are analyzed by the ML algorithm 812 to "classify" the training data against the target model (or the model's task) and uncover relationships between and among the classified training data. Examples of suitable implementations of the ML algorithms 812 include but are not limited to neural networks, support vector machines (SVMs), logistic regression, decision trees, hidden Markov Models (HMMs), etc. The learning or training performed by the ML algorithms 812 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier 810 and the ML algorithms 812. Unsupervised learning can utilize additional learning/training methods including, for example, clustering, anomaly detection, neural networks, deep learning, and the like.

When the models 816 are sufficiently trained by the ML algorithms 812, the data sources 802 that generate "real world" data are accessed, and the "real world" data is applied to the models 816 to generate usable versions of the results 820. In some embodiments of the invention, the results 820 can be fed back to the classifier 810 and used by the ML algorithms 812 as additional training data for updating and/or refining the models 816.

In aspects of the invention, the ML algorithms 812 and the models 816 can be configured to apply confidence levels (CLs) to various ones of their results/determinations (including the results 820) in order to improve the overall accuracy of the particular result/determination. When the ML algorithms 812 and/or the models 816 make a determination or generate a result for which the value of CL is below a predetermined threshold (TH) (i.e., CL<TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the classifier 810 can be configured to apply confidence levels (CLs) to the results 820. When the classifier 810 determines that a CL in the results 820 is below a predetermined threshold (TH) (i.e., CL<TH), the results 820 can be classified as sufficiently low to justify a classification of "no confidence" in the results 820. If CL>TH, the results 820 can be classified as sufficiently high to justify a determination that the results 820 are valid. Many different predetermined TH levels can be provided such that the results 820 with CL>TH can be ranked from the highest CL>TH to the lowest CL>TH.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 9:
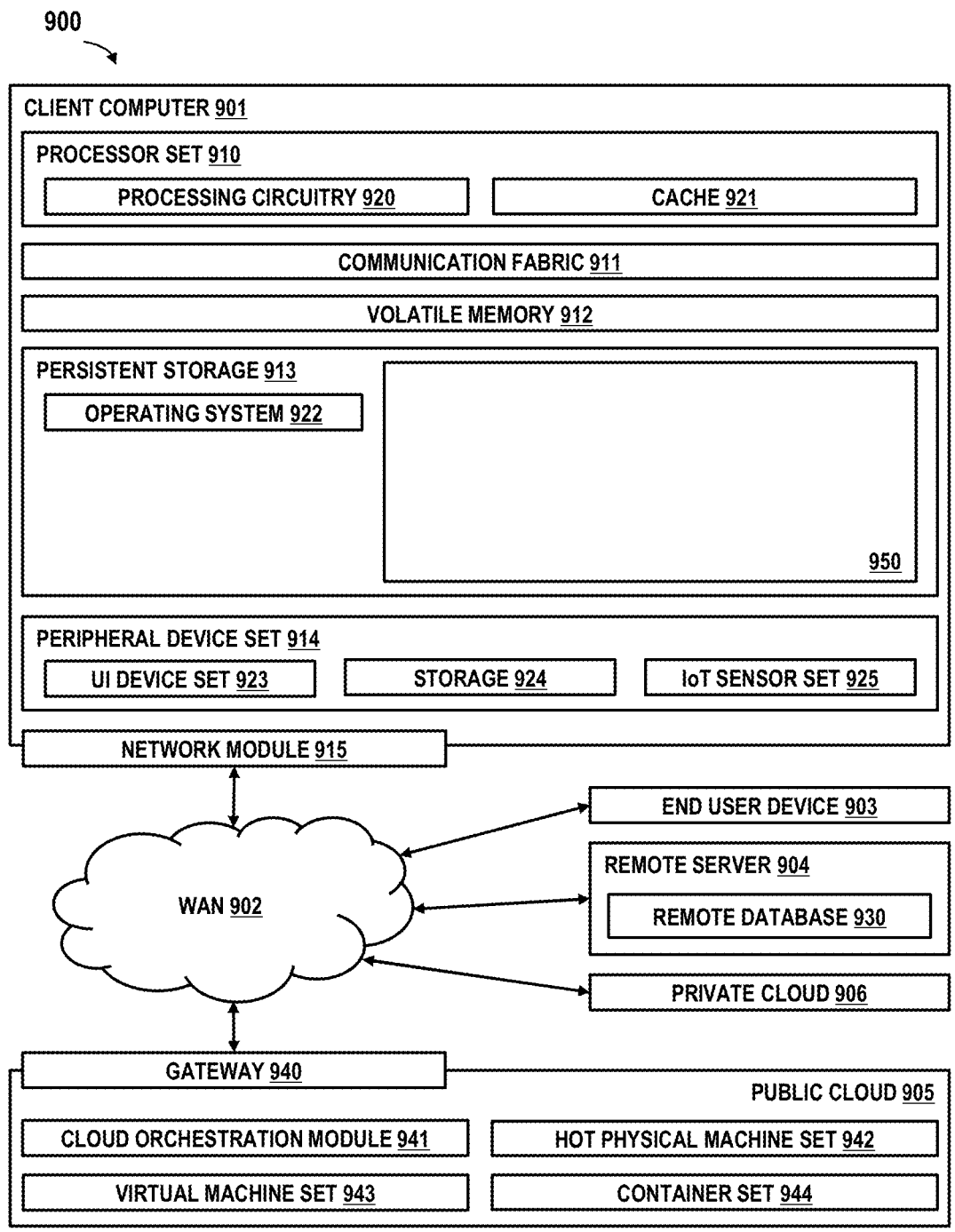
FIG. 9 depicts details of an exemplary computing environment operable to implement various aspects of the invention.

FIG. 9 depicts an example computing environment 900 that can be used to implement aspects of the invention. Computing environment 900 contains an example of an environment for the execution of at least some of the computer code involved in performing the inventive methods, such as the improved cognitive placement of caption text 950. In addition to block 950, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 950, as identified above), peripheral device set 914 (including user interface (UI) device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in block 950 in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface-type operating systems that employ a kernel. The code included in block 950 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" and variations thereof are used herein to mean "serving as an example, instance or illustration." Any embodiment or design described herein as "exemplary" is not necessarily to be construed as preferred or advantageous over other embodiments or designs. The terms "at least one," "one or more," and variations thereof, can include any integer number greater than or equal to one, i.e. one, two, three, four, etc. The terms "a plurality" and variations thereof can include any integer number greater than or equal to two, i.e., two, three, four, five, etc. The term "connection" and variations thereof can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The phrases "in signal communication", "in communication with," "communicatively coupled to," and variations thereof can be used interchangeably herein and can refer to any coupling, connection, or interaction using electrical signals to exchange information or data, using any system, hardware, software, protocol, or format, regardless of whether the exchange occurs wirelessly or over a wired connection.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:

1. A computer system comprising a processor communicatively coupled to a memory, wherein the processor performs processor operations comprising:
    accessing video information having a plurality of image regions;
    accessing text associated with the video information;
    performing a relevance evaluation on each of the plurality of image regions to determine a set of relevance results;
    wherein the relevance evaluation comprises an assessment, based at least in part on the text, of a viewer's understanding of the plurality of image regions;
    determining a first group of relevance results within the set of relevance results;
    determining a first group of image regions within the plurality of image regions that are associated with the first group of relevance results; and
    incorporating the text within an image region selected from the first group of image regions.

2. The computer system of claim 1, wherein:
    the processor comprises one or more machine learning (ML) models; and
    the processor operations use the one or more ML models to perform the relevance evaluation on each of the plurality of image regions.

3. The computer system of claim 1, wherein:
    the relevance evaluation comprises a first relevance evaluation; and
    the processor operations further comprise selecting the image region selected from the first group of image regions based at least in part on results of performing a second relevance evaluation on the first group of image regions;

wherein the second relevance evaluation comprises an assessment, based at least in part on the text, of the viewer's understanding of the first group of image regions.

4. The computer system of claim 3, wherein the results of performing the second relevance evaluation comprise a ranking of relevance levels of each image region in the first group of image regions.

5. The computer system of claim 4, wherein the image region selected from the first group of image regions is selected based at least in part on a lowest one of the relevance levels.

6. The computer system of claim 5, wherein the processor operations further comprise determining a placement location of the text within the image region selected from the first group of image regions by performing, based at least in part on visibility intrusiveness constraints and the text, a visibility intrusiveness analysis on the image region selected from the first group of image regions.

7. The computer system of claim 6, wherein:
the processor comprises one or more machine learning (ML) models; and
the processor operations use the one or more ML models to perform:
the first relevance evaluation on each of the plurality of image regions;
the second relevance evaluation on the first group of image regions; and
the visibility intrusiveness analysis on the image region selected from of the first group of image regions.

8. A computer-implemented method comprising:
accessing, using a processor system, video information having a plurality of image regions;
accessing, using the processor system, text information associated with the video information;
using the processor system to perform a relevance evaluation on each of the plurality of image regions to determine a set of relevance results;
wherein the relevance evaluation comprises an assessment, based at least in part on the text, of a viewer's understanding of the plurality of image regions;
determining, using the processor system, a first group of relevance results within the set of relevance results;
determining, using the processor system, a first group of image regions within the plurality of image regions that are associated with the first group of relevance results; and
incorporating, using the processor system, the text within an image region selected from the first group of image regions.

9. The computer-implemented method of claim 8, wherein:
the processor system comprises one or more machine learning (ML) models; and
the processor system uses the one or more ML models to perform the relevance evaluation on each of the plurality of image regions.

10. The computer-implemented method of claim 8, wherein:
the relevance evaluation comprises a first relevance evaluation; and
the computer-implemented method further comprises selecting, using the processor system, the image region selected from the first group of image regions based at least in part on results of performing a second relevance evaluation on the first group of image regions;
wherein the second relevance evaluation comprises an assessment, based at least in part on the text, of the viewer's understanding of the first group of image regions.

11. The computer-implemented method of claim 10, wherein the results of performing the second relevance evaluation comprise a ranking of relevance levels of each image region in the first group of image regions.

12. The computer-implemented method of claim 11, wherein the image region selected from the first group of image regions is selected based at least in part on a lowest one of the relevance levels.

13. The computer-implemented method of claim 12 further comprising determining, using the processor system, a placement location of the text within the image region selected from the first group of image regions by performing, based at least in part on visibility intrusiveness constraints and the text, a visibility intrusiveness analysis on the image region selected from the first group of image regions.

14. The computer-implemented method of claim 13, wherein:
the processor comprises one or more machine learning (ML) models; and
the processor operations use the one or more ML models to perform:
the first relevance evaluation on each of the plurality of image regions;
the second relevance evaluation on the first group of image regions; and
the visibility intrusiveness analysis on the image region selected from the first group of image regions.

15. A computer program product comprising a computer readable program stored on a computer readable storage medium, wherein the computer readable program, when executed on a processor, causes the processor to perform processor operations comprising:
accessing video information having a plurality of image regions;
accessing text associated with the video information;
performing a relevance evaluation on each of the plurality of image regions to determine a set of relevance results;
wherein the relevance evaluation comprises an assessment, based at least in part on the text, of a viewer's understanding of the plurality of image regions;
determining a first group of relevance results within the set of relevance results;
determining a first group of image regions within the plurality of image regions that are associated with the first group of relevance results; and
incorporating the text within an image region selected from the first group of image regions.

16. The computer program product of claim 15, wherein:
the processor comprises one or more models; and
the processor operations use the one or more models to perform the relevance evaluation on each of the plurality of image regions.

17. The computer program product of claim 15, wherein:
the relevance evaluation comprises a first relevance evaluation; and
the processor operations further comprise selecting the image region selected from the first group of image regions based at least in part on results of performing a second relevance evaluation on the first group of image regions;

wherein the second relevance evaluation comprises an assessment, based at least in part on the text, of the viewer's understanding of the first group of image regions.

18. The computer program product of claim 17, wherein:
the results of performing the second relevance evaluation comprise a ranking of relevance levels of each image region in the first group of image regions; and
the image region selected from the first group of image regions is selected based at least in part on a lowest one of the relevance levels.

19. The computer program product of claim 18, wherein the processor operations further comprise determining a placement location of the text within the image region selected from the first group of image regions by performing, based at least in part on visibility intrusiveness constraints and the text, a visibility intrusiveness analysis on the image region selected from the first group of image regions.

20. The computer program product of claim 19, wherein:
the processor comprises one or more machine learning (ML) models; and
the processor operations use the one or more ML models to perform:
the first relevance evaluation on each of the plurality of image regions;
the second relevance evaluation on the first group of image regions; and
the visibility intrusiveness analysis on the image region selected from the first group of image regions.

\* \* \* \* \*